(12) United States Patent
Schmidt et al.

(10) Patent No.: US 8,707,729 B2
(45) Date of Patent: Apr. 29, 2014

(54) ADSORPTION HEAT PUMP, ADSORPTION REFRIGERATOR AND ADSORBER ELEMENTS THEREFOR

(75) Inventors: Ferdinand Schmidt, Freiburg (DE); Hans-Martin Henning, Freiburg (DE); Gunther Munz, St. Peter (DE); Gerald Rausch, Bremen (DE); Andrea Berg, Bremen (DE); Norbert Rodler, Zolling (DE); Cornelia Stramm, Munich (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1173 days.

(21) Appl. No.: 12/280,497

(22) PCT Filed: Feb. 26, 2007

(86) PCT No.: PCT/EP2007/001632
§ 371 (c)(1),
(2), (4) Date: Mar. 23, 2009

(87) PCT Pub. No.: WO2007/098904
PCT Pub. Date: Sep. 7, 2007

(65) Prior Publication Data
US 2009/0217691 A1    Sep. 3, 2009

(30) Foreign Application Priority Data
Feb. 24, 2006  (DE) .......................... 10 2006 008 786

(51) Int. Cl.
*F25B 15/00*  (2006.01)
*F25D 23/00*  (2006.01)
*F25B 15/12*  (2006.01)
*F25B 27/00*  (2006.01)

(52) U.S. Cl.
USPC .................. 62/476; 62/271; 62/484; 62/494; 62/112; 62/238.3; 165/104.26

(58) Field of Classification Search
USPC .................. 62/101, 487, 271, 476, 484, 494; 165/104.26
See application file for complete search history.

(56) References Cited

U.S. PATENT DOCUMENTS 2,989,383 A    6/1961  Miller
4,367,079 A *  1/1983  Wallsten ........................ 96/126
(Continued)

FOREIGN PATENT DOCUMENTS

DE    198 60 151 A1    7/2000
DE    199 29 718 A1    12/2000
(Continued)

OTHER PUBLICATIONS

M. A. Lambert et al., "A Review of Solid-Vapor Adsorption Heat Pumps," 41st AIAA Aerospace Sciences Meeting and Exhibit, Jan. 6-10, 2003, Reno, NV, AIAA 2003-0514, pp. 1-17.
(Continued)

*Primary Examiner* — Frantz Jules
*Assistant Examiner* — Joseph Trpisovsky
(74) *Attorney, Agent, or Firm* — Greenblum & Bernstein, P.L.C.

(57) ABSTRACT

The invention relates to an adsorber element for a heat exchanger and an adsorption heat pump or adsorption refrigerator that contains at least one such adsorber element. The adsorber element includes a heat-conducting solid body and a sorption material for a vaporous adsorbate arranged on the surface of this solid body. A fluid-tight foil composite is arranged on the outer surface of the open-pore solid body, at least in the areas in which a contact with a heat transfer fluid is provided, wherein this adsorber element is embodied such that the heat exchange between the open-pore solid body and the heat transfer fluid can take place via the fluid-tight foil composite.

15 Claims, 4 Drawing Sheets

(56) References Cited

U.S. PATENT DOCUMENTS

| | | | |
|---|---|---|---|
| 4,610,148 A | 9/1986 | Shelton | |
| 4,694,659 A | 9/1987 | Shelton | |
| 4,765,396 A | 8/1988 | Seidenberg | |
| 4,819,717 A | 4/1989 | Ishikawa et al. | |
| 6,102,107 A | 8/2000 | Dunne | |
| 6,672,103 B1 * | 1/2004 | Stach et al. | 62/480 |
| 6,766,817 B2 | 7/2004 | de Silva | |
| 6,973,963 B2 | 12/2005 | Dunne et al. | |
| 7,285,255 B2 | 10/2007 | Kadlec et al. | |
| 7,704,305 B2 * | 4/2010 | Nishida | 96/154 |
| 2005/0061483 A1 | 3/2005 | Dunne et al. | |
| 2005/0235673 A1 * | 10/2005 | Sueoka et al. | 62/271 |
| 2006/0101847 A1 * | 5/2006 | Henning | 62/480 |

FOREIGN PATENT DOCUMENTS

| | | | |
|---|---|---|---|
| DE | 19929718 A1 * | 12/2000 | F28D 20/00 |
| DE | 101 19 258 A1 | 10/2001 | |
| DE | 101 59 652 C2 | 7/2003 | |
| DE | 103 09 009 A1 | 9/2004 | |
| DE | 2005 037 708 A1 | 2/2007 | |
| EP | 0 462 226 B1 | 12/1991 | |
| EP | 0 682 768 B1 | 11/1995 | |
| EP | 1 093 868 A1 | 4/2001 | |
| EP | 1 525 428 B1 | 4/2005 | |
| JP | 07 190657 A | 7/1995 | |
| JP | 2004 361067 A | 12/2004 | |
| WO | WO-02/45847 A2 | 6/2002 | |
| WO | WO 03087682 * | 10/2003 | F25B 17/08 |

OTHER PUBLICATIONS

L.G. Gordeeva et al., "Prep. of Zeolite Layers w/Enhanced Mass Trans . . . ," Proc. of the Int. Sorption Heat Pump Conf. (ISHPC), Shanghai, China, Sep. 24-27, 2002, pp. 625-629.

F. Scheffler et al., "Preparation and properties of an electrically heatable aluminum foam/zeolite composite," Microporous and Mesoporous Materials 67, 2004, p. 53-59.

A. Erdem-Senatalar et al., "Preparation of zeolite coatings by direct heating of the substrates," Microporous and Mesoporous Materials 32, 1999, pp. 331-343.

International Search Report for PCT/EP2007/001632 and English translation of the international preliminary report on patentability and written opinion.

Office action, dated Nov. 3, 2006, from German Patent Appln. No. 10 2006 008 786.0, and English translation.

* cited by examiner

ADSORPTION HEAT PUMP, ADSORPTION REFRIGERATOR AND ADSORBER ELEMENTS THEREFOR

BACKGROUND OF THE INVENTION

1. Field of the Invention

The invention relates to an adsorber element for a heat exchanger, which contains as a central component a heat-conducting solid body, on the surface of which a sorption material for a vaporous adsorbate and on the outer surface of which a fluid-tight foil, or composite film, is arranged. The invention further relates to an adsorption heat pump or adsorption refrigerator that contains at least one adsorber element of this type.

2. Description of Background and Other Information

With many technical adsorption processes, the power with which the adsorption heat can be removed via a heat exchanger plays an important role. This applies analogously to the heat transfer efficiency in heating the adsorbent via a heat exchanger for the desorption/reconditioning of the adsorbent (usually referred to below as sorption material). These power characteristics are of central importance for adsorption heat pumps and adsorption refrigerators and related adsorption applications in energy and climate control technology.

Various companies, e.g., Vaillant, UOP, Mitsubishi and SorTech, are currently working intensively on concepts for adsorption heat pumps and adsorption refrigerators to increase the power density related to the construction volume.

In physical terms, this hereby relates to the problem of optimizing the heat and matter transfer in the heat pump. In a microporous solid (adsorbent/sorption material, e.g., a zeolite or a silica gel) the vapor of the working fluid (adsorbate, e.g., water, methanol or ammonia) is adsorbed, wherein heat is released.

For an improved adsorber element, therefore, a good thermal link of the microporous adsorbent/sorption material (e.g., a zeolite) to a heat-exchanger surface or to a heat transfer fluid flowing on the other side of this boundary layer is necessary.

DE 10 2005 037 708 A1 and DE 10 2005 037 763 A1 describe a compact structure, with which an improved heat transfer is achieved from the heat exchanger plate to the heat transfer fluid. This is achieved either by means of a cylindrical heat exchanger or by means of a plate heat exchanger in which the heat transfer fluid flows through channels in the heat exchanger plate.

DE 101 19 258 A1 describes an adsorber structure in which the adsorbent is placed on the fins of a finned tube in one layer in the form of granules. A better thermal contact of the sorption material to the heat exchanger can be obtained with a structure according to U.S. Pat. No. 6,102,107. The adsorber is hereby designed as a fin coil heat exchanger, that is as a bundle of parallel plates that are pushed through a tube bundle in a perpendicular manner. The heat transfer fluid flows in the tubes and the sorption material is applied to the plates as a layer on both sides. The sorption material is hereby bonded in a polymer foil. With an adsorber design of this type a good thermal link of the sorption material to the heat exchanger surface can be obtained such that the heat transfer to the heat transfer fluid in the heat exchanger becomes the limiting factor for the achievable power density of the heat pump.

Through an adsorber design of this type, however, the power densities are not yet achieved that are required for certain applications (e.g., for car air-conditioning). In order to further increase the power density of adsorption heat pumps and, at the same time, to render possible a high efficiency (COP, performance factor), new concepts are necessary for the design of the adsorber.

The (thermal) COP (Coefficient of Performance) for a refrigerator is understood to be the ratio of useful cold obtained and the driving heat required for this; for a heat pump the COP is defined as the ratio of the useful heat obtained (at the average temperature level) to the driving heat (at high temperature level). For practical application additionally a consideration of the overall energy expenditure is necessary, including the electric consumption of pumps, etc.

A problem in addition to the above-referenced problems is the limitation of the adsorption speed by the transport of the gaseous and/or vaporous adsorbate to the micropores or mesopores of the solid sorption material, where the adsorption heat is released. This problem occurs in particular with adsorbates with low vapor pressure, such as, e.g., water or methanol. In particular with thick layers of the sorption material, a high diffusion barrier results for the adsorbing gas, depending on the structure of the layer.

According to WO 02/45847 one solution approach is to achieve a sufficient vapor-permeability of the sorption material layer by bonding the sorption material micro-particles into a vapor-permeable polymer matrix with good thermal conductivity. DE 101 59 652 C2 describes the insertion of sorption material into a foam-like matrix of metal.

Another approach to a solution—at least for zeolite sorption materials—is described in L. G. Gordeeva et al. "Preparation of Zeolite Layers with Enhanced Mass Transfer Properties for Adsorption Air Conditioning" in Proc. of the Int. Sorption Heat Pump Conf. ISHPC, Shanghai, China, Sep. 24-27, 2002. Here, a suitable pore former is added during the synthesis of the sorption material layer, which is subsequently burnt out or washed out, in order to create additional channels for the vapor transport.

SUMMARY OF THE INVENTION

The present invention overcomes the disadvantages of the prior art and is directed to an adsorber element with which the heat being released during adsorption can be efficiently dissipated and the heat necessary in desorption can be easily added.

In addition, the invention provides a heat pump or refrigerator that contains several adsorber elements according to the invention in an arrangement that likewise renders possible an efficient dissipation or addition of heat and in addition an efficient heat recovery between several identical or similarly constructed adsorbers.

Furthermore, the invention provides for an adsorber element and a heat pump or refrigerator in which a highest possible COP can be established and in particular the thermal mass (heat capacity) of the carrier structure for the sorption material and the other components of the heat exchanger is as low as possible so that the greatest possible ratio of the sorbate heat transformation to sensible heat transformation can be achieved via the adsorption cycle.

In summary, the invention encompasses an adsorber element, an adsorption heat pump, and an adsorption refrigerator, as well as additional advantageous developments.

According to the invention, it has been recognized that a reduction in the heat transmission resistances in the adsorber and at the same time a reduction of the thermal mass of the heat exchanger is possible if the adsorber element is based on a heat-conducting solid body, on the boundary layer of which to the heat transfer fluid a fluid-tight, composite film, hereafter foil composite, is arranged. The heat-conducting solid body can then have a desired structure or the sorption material can be arranged thereon in any desired manner, since the foil composite takes over the function of acting as a boundary layer between heat transfer fluid and solid body coated with sorption material. The adsorber element according to the invention thus comprises a heat-conducting solid body, on the surface of which a sorption material for a vaporous adsorbate is arranged, and on the outer surface of which in the areas in which a contact with a heat transfer fluid is provided or takes place, a fluid-tight foil composite is arranged that is connected to the heat-conducting solid body positively, non-positively or by adhesive force. According to the invention, the outer surface of the heat-conducting solid body is to be understood as meaning the area of the solid body surface in which a contact of the solid body with a heat transfer fluid (via the fluid-tight foil composite) is provided or takes place. The adsorber element is furthermore embodied such that the heat exchange between the heat-conducting solid body and the heat transfer fluid can take place via this foil composite and, according to a particular embodiment, exclusively or at least essentially exclusively. The fluid-tight foil composite has at least one metal layer or a layer of a material that is heat conducting at least in the perpendicular orientation to the layer, and at least one other layer that is a base layer or a sealing layer.

The metal layer contained in the foil composite or the layer of the heat conducting material (e.g., a heat-conducting polymer that can contain, e.g., metal particles or carbon, e.g., in the form of nanotubes) in perpendicular orientation to the layer, ensures in particular that vacuum tightness is given and that it is ensured that the areas in which the heat transfer fluid and the adsorbate are located are separated from one another in a fluid-tight manner. The metal layer, in a particular embodiment, is a layer that comprises aluminum and/or copper or contains aluminum and/or copper. In a particular embodiment, the metal layer is so thick that a thermal conductivity of the foil composite perpendicular to the foil plane is given (such as, e.g., a heat conductivity of at least $0.2$ W m$^{-1}$ K$^{-1}$ or, in particular variation, at least $2$ W m$^{-1}$ K$^{-1}$; the thermal conductivity is always determined according to the invention via the thermal diffusivity with the laser-flash method); for this the thickness of the layer should be at least in the μm range and in particular be greater than $1$ μm. If the foil composite is not wetted by the heat transfer fluid over the entire area, the layer should be thick enough that it can also contribute appreciably to the heat transfer along the foil; the thermal conductivity along the layer should then be, in a particular embodiment, at least $20$ W m$^{-1}$ K$^{-1}$. In order that barrier properties of the foil composite can also be ensured (and the foil composite can be applied onto the heat-conducting solid body by means of a vacuum packing method), this metal layer must be pore-free and must have a thickness of at least $12$ μm, or, in a particular embodiment, at least $15$ μm.

The sealing layer serves to render possible a connection (in particular welding or adhesion) of the ends of the foil composite so that vacuum tightness or seal tightness is given with respect to the heat transfer fluid. However, it is also possible to omit the sealing layer and to achieve the connection of the foil ends, e.g., by means of a sintering method. The welding of the foil ends can be carried out by means of conventional foil-welding methods, e.g., thermally (sealing layers of polyethylene or polypropylene are suitable for this in particular) or by means of ultrasound (also with foil composites without a sealing layer) or microwaves (also with foil composites without a sealing layer). The sealing layer is usually arranged as outermost layer on one or on both sides of the foil composite. This has the advantage that easy connection of the foil ends is possible. In this case the base layer should not then comprise a material that can swell by contact with the adsorbate (in particular if methanol is used as the adsorbate), or that permits laminating adhesive between the layers of the foil composite to be dissolved or partially dissolved through diffusing adsorbate. According to the invention the sealing seam strength of the sealing seams should be at least $25$ N/15 mm or, in a particular embodiment, $50$ N/15 mm (measured according to leaflet 33 of Fraunhofer IVV "Bestimmung der Festigkeit von Heißsiegelnähten—Quasistatische Methode") so that long-term stability is also ensured with the use of the adsorber elements in environments with high mechanical stress (e.g., in the engine compartment of a motor vehicle). The thickness of the sealing layer to produce sealing seams of this type should be at least $30$ μm and, in a particular embodiment, at least $50$ μm. Compared to metal sheets as boundary layer between heat transfer fluid and solid body with sorption material, a foil composite with a sealing layer has the advantage that the vacuum-tight separation from heat transfer fluid and sorption material can be achieved with substantially lower production expenditure. Furthermore, corrosion problems are avoided, which in the case of the connection of metal sheets could occur through soldering processes.

The foil composite can be additionally stabilized by means of a base layer. In particular the breaking strength of the foil composite can thus be ensured and the mechanical stability thereof increased (i.e., in particular render possible a protection against damage and injury). The base layer, according to particular embodiments, comprises polyamide, polyethylene terephthalate, or a fluorine-containing polymer or contains one of these materials. The material of the base layer, in a particular embodiment, is selected such that the base layer contributes to the vacuum tightness of the foil composite. Furthermore, in a particular embodiment, the base layer contains additives that increase the thermal conductivity of the base layer (e.g., carbon). The base layer is frequently arranged on the side of the foil composite facing away from the outside of the heat-conducting solid body, in particular as the outermost layer or as a layer arranged under an outermost sealing layer. In this case the base layer should not comprise a material that can swell through contact with the heat transfer fluid or that permits the laminating adhesive between the layers of the foil composite to be dissolved or partially dissolved through the heat transfer fluid. The foil composite should have a base layer if there is a danger of injury from the heat-conducting solid body (in particular by perforation). This danger of injury depends on the mechanical stress of the adsorber elements and can occur in particular with open-pore heat-conducting solid bodies. The thickness of the base layer should then be at least $10$ μm.

In a particular embodiment, the foil composite has at least one metal layer, at least one sealing layer and at least one base layer. A sealing layer is frequently arranged on one side of the metal layer and a base layer on the other side. The layers are usually connected to one another by means of a suitable laminating adhesive or binder. In order to ensure long-term durability, the temperature stability of each individual layer of the foil composite should be given (in particular at above $100°$ C. or, in a particular embodiment, also above $120°$ C.). In order to ensure the delamination resistance, the interlayer adhesion of the foil composite should be at least $3$ N/15 mm or, in a particular embodiment, $4$ N/15 mm (the interlayer adhesion is tested based on the IVV leaflet 5 "Prüfung wachskaschierter Verbundpackstoffe aus Papieren und/oder Folien—Messung der Spaltfestigkeit"). The mechanical stability of the foil composite should be designed in the case of high mechanical stress on the adsorber element, in particular with the use of open-pore heat-conducting solid bodies, such that the foil composite cannot be damaged by the solid body. A puncture strength of greater than 6 N or, in a particular embodiment, greater than 12 N should therefore be given, if no after-treatment (in particular smoothing) of the open-pore solid body is to be carried out. The puncture strength is tested according to DIN EN 14477.

The foil composite used according to the invention ensures that the heat transfer fluid cannot come into contact with the sorption material. On the other hand, by using a foil composite it is ensured that the boundary layer between heat transfer fluid and heat-conducting solid body is very thin and therefore an efficient heat exchange from the solid body to the heat transfer fluid can take place. The adsorber elements according to the invention furthermore have the advantage that the foil composites contained therein have a low thermal mass so that with good sorptive/sensible heat ratio short thermal paths can be achieved from the sorption material to the heat transfer fluid. The thermal mass is much lower than with metal sheets, such as are known, e.g., from plate heat exchangers, so that the expansion of the heat-conducting solid body perpendicular to the contact surface with the foil composite can be considerably reduced. Nevertheless, the ratio of sorptive heat transformation to sensible heat transformation can be achieved as with the use of a metal sheet as a boundary layer. The application of findings from microsystem technology and microfluidics regarding the intensification of the heat transfer and mass transport in adsorbers of heat pumps is therefore rendered possible through the use of a foil composite. Usually the fluid-tight foil composite will therefore be connected flat to the heat-conducting solid body, wherein a connection by adhesive force is not necessary, however. The fluid-tight foil composite can also be (but does not have to be) arranged, e.g., in tubular channels that pass through the heat-conducting solid body. The use of a foil composite makes it possible to minimize the thickness of the boundary layer between the heat transfer fluid and the heat-conducting solid body, since by using a metal layer (or a layer of the heat-conducting material in perpendicular orientation to the layer) and a base layer or a sealing layer the mechanical stability can be increased and the processability can be improved. However, at the same time the greatest possible flexibility exists regarding the surface structures flowed around or flowed through by the heat transfer fluid and also regarding the arrangement of the structures that are to be flowed through by the heat transfer fluid. In a particular embodiment, the foil composite should be so flexible that it clings to the surface of the solid body upon the application of a vacuum, so that grooves present on the surface or optionally also pores with a diameter of greater than 0.5 mm already exhibit a flat contact between the surface of the grooves or surface of the pores of the solid body and the fluid-tight foil composite.

It also has been recognized according to the invention that the thermal mass of the heat transfer medium can be reduced (in favor of a higher COP) if instead of a mechanical stability with respect to the pressure of the heat transfer fluid of the boundary surface between the heat transfer fluid and the solid body/sorption material over the entire area of the boundary surface, a mechanical stability is required only in those areas in which the boundary surface is not directly located on the outer surface of the solid body (e.g., with open-porous solid bodies a mechanical stability on the surface scale of the pores of the open-porous structure). In this case the heat-conducting solid body takes over the function of the mechanical stabilization or the pressure difference between the heat transfer fluid and the vapor pressure of the vaporous adsorbate.

The arrangement according to the invention furthermore has the advantage that a fluid-tight foil composite can be easily connected to the heat-conducting solid body, and remains on the surface of the solid body during the operation of the heat exchanger even without additional auxiliaries, as long as a negative pressure (relative to the fluid side) is present on the solid body side (such as, for example, with heat exchangers that operate with vaporous water or methanol as adsorbate), or a positive pressure (relative to the adsorbent side) is present on the fluid side. Furthermore, the arrangement has the advantage that the foil can be removed and replaced easily (e.g., in the event of material fatigue of a component of the heat exchanger or in the recycling of the heat exchanger). Materials that are vacuum tight are therefore used, in a particular embodiment, include foil composite. Furthermore, the foil composite should be permanently stable in the temperature range usually provided for the application (such as, in a particular embodiment, above 100° C. or, in another particular embodiment, above 120° C.).

The fluid-tight foil composite is usually arranged in the adsorber element according to the invention such that the heat transfer fluid flows around the heat-conducting solid body only on the outer surface thereof and cannot flow through the solid body or only to a slight extent in the form of tubular or channel-like forms. However, in individual cases, the latter can be useful.

The ratio of the sorptive heat transformation to the sensible heat transformation of the adsorber element according to the invention is greater than 2.5, in a particular embodiment or, in a variation, greater than 5. The influence of this heat ratio on the efficiency (COP) depends decisively on the degree of the heat recovery achieved. With very good internal heat recovery, a poorer sorptive/sensible heat ratio is acceptable than with poorer heat recovery (particularly in this case it is also acceptable to fall below the value of 2.5). In order to achieve a compact construction and a high power density of the heat pump, the average heat transmission resistance from the adsorbent to the heat transfer fluid should be so small that cycle times of less than 10 minutes can be achieved or, in a particular embodiment, less than 5 minutes or, in a variation, less than 3 minutes.

The heat-conducting solid body is at least in part an open-pore solid body, according to a particular embodiment. According to the invention this includes any material that ensures that the vaporous adsorbate used (in particular water and/or methanol or optionally also ammonia) can not only flow around the outer surface of the solid body, but can also flow through an existing inner surface of the solid body. In a particular embodiment of the invention, the open-pore solid body should have an effective thermal conductivity of greater than $2 \text{ W m}^{-1}\text{K}^{-1}$ or, in a variation, greater than $6 \text{ W m}^{-1}\text{K}^{-1}$ (in particular in the direction perpendicular to its contact surface with the foil composite). In a particular embodiment, the open-pore solid body should have a porosity >70% and thereby at the same time an effective thermal conductivity of greater than $8 \text{ W m}^{-1}\text{K}^{-1}$ (in particular in the direction perpendicular to its contact surface with the foil composite).

According to the invention an open-pore solid body generally means any open-porous structure that has a pore volume accessible by diffusion for a gas of at least 20% relative to the total volume (bulk volume) of the solid body. In an advantageous embodiment the open-pore solid body is a metal foam (or metallic sponge) or a fibrous material.

It has been recognized according to the invention that with an adsorber element on the basis of an open-porous solid body, the sorption material is contained in a mechanically stable matrix with good thermal conductivity. This matrix is frequently additionally stabilized by the fluid-tight foil composite. With adsorber elements of this type that have a large surface (in particular relative to the inner surface) compared to the volume, a higher total heat transfer value to the heat transfer fluid (or a shorter "thermal path") can be realized (due to the porous solid body structure and the much larger contact surface to the heat transfer fluid compared to a tube bundle).

According to the invention, it has been further recognized that the combination of power density and efficiency (COP) can additionally be improved through the use of open-pore solid bodies. If one of these two parameters is worse compared to the prior art, this effect will always be overcompensated by an increase of the other parameter. However, both parameters are often increased compared to the prior art. The portion of sensible heat can be reduced compared to the solutions conventionally proposed according to the prior art. The open-porous solid body has a specific surface that is at least twice as large (usually even five times as large) for example compared to fin coil heat exchangers according to the prior art, whereby thinner adsorbent layers and shorter thermal paths are possible. The disadvantage of any higher thermal mass is thereby overcompensated. (The thermal paths are shorter according to the invention compared to those with a fin coil heat exchanger above all because with the fin coil heat exchanger the heat has to be emitted to tubes, which cannot be laid as densely as desired and which have to be connected to one another individually. The fluid-tight foil composites used according to the invention, however, permit a much larger specific contact surface to the heat transfer fluid.)

A quicker heat transfer is possible due to a high thermal conductivity of the adsorber element according to the invention; furthermore, a very close coupling of the adsorber to a heat transfer fluid in an external hydraulic circuit can be realized, which is to be circulated with the lowest possible consumption of outside energy.

The improved COP is to be attributed with the current invention on the one hand to an improved heat recovery (in particular with the use of the adsorber elements in an arrangements that renders possible a "thermal wave"), and on the other hand to an improved ratio of mass of the sorption material to the heat exchanger mass. According to the prior art (e.g., WO 02/45847) it has been attempted to adjust this mass ratio by the thickest possible layers of sorption material; however, this results—depending on the structure of the layer—in a high diffusion barrier for the gas to be adsorbed and frequently also to a stability problem of the layer or of the composite of sorption material and heat exchanger (on the one hand because of the positive pressure that builds up due to diffusion barriers in the desorption in the lowest ply of the layer, on the other hand due to the different thermal coefficients of expansion of sorption material and heat exchanger and the rapid thermal cycling of this composite). According to the invention, however, it has been recognized that through an application of sorption material onto the inner surface of an open-pore heat-conducting solid body, the mass of the sorption material can be increased and at the same time a small layer thickness can be adjusted. An improved heat recovery can be achieved with the adsorber elements according to the invention in particular if the length of the flow channels of the heat transfer fluid (in the flow direction) is very great compared to the thickness of the adsorber element (perpendicular to the plane of the flow or the foil composite). The thermal conduction in the solid body in the flow direction of the fluid is then of low importance and the prerequisites for realizing a thermal wave (which permits a good heat recovery) are given.

If the length of the flow paths are to be further increased in order to improve the efficiency of the thermal wave, this is easily possible with the adsorber elements according to the invention in that several thereof are flowed through serially.

In one variant respectively two halves of the open-porous solid body are embodied such that they can take over the function of the spacer, which ensures an unobstructed inflow of the vaporous adsorbate or the provision of a transport structure that can be flowed through well. To this end, for example channels or a wave structure can be embossed in the side of the respective half of the open-porous solid body facing away from the foil composite such that flow channels remain free when adjacent elements of the open-porous solid body bear against one another. A sufficient mechanical stability of the open-porous solid body (i.e., sufficiently large support surfaces) must thereby always be ensured with respect to the positive pressure of the heat transfer fluid. In an alternative embodiment of the invention, instead of respectively two halves that bear against one another, only one solid body can be used that has a sandwich structure. In this sandwich structure a "transport layer" is located in the center that has a lower flow-through resistance than the two "stabilizing layers" on the outside.

In general in this embodiment, the "stabilizing layers" will have a higher specific surface area, a higher thermal conductivity, and a lower porosity than the "transport layer." The production of a sandwich structure of this type can be managed particularly advantageously using short metallic fibers of varying length and thickness, in particular melt-extracted short metallic fibers. The fluid-tight foil composite is then arranged respectively on the sides of the "stabilizing layers" of the sandwich element facing away from the transport layer.

The adsorbent (or sorption material; e.g., a zeolite, silicoaluminophosphate (SAPO) or a silica gel) can be applied in different ways onto the surface of the open-pore or non-open-pore heat-conducting solid body or introduced into the porous solid body structure. A particular variant is the crystallization of zeolites by a consumptive method. When an aluminum-containing open-pore solid body (for example, an aluminum sponge) is used, this can serve as an aluminum source of the zeolite synthesis (cf. F. Scheffler et al. in: Preparation and properties of an electrically heatable aluminum foam/zeolite composite, Microporous and Mesoporous Materials 67, 2004, p. 53-59). Furthermore, a crystallization can take place by the "thermal gradient" method (cf. A. Erdem-Senatalar et al. in: Preparation of zeolite coatings by direct heating of the substrates, Microporous and Mesoporous Materials 32, 1999, p. 331-343). Moreover a coating with adsorbent can take place by dipping into a suspension containing the adsorbent. Moreover—in the case of heat-conducting open-pore solid bodies—additionally (or optionally also exclusively) a filling of the (remaining) cavities with further sorption material can take place. If the sorption material is arranged on the outer surface of the heat-conducting solid body, it is also conceivable to use a paper layer coated with the sorption material, as is described in U.S. Pat. No. 6,973,963 B2 (especially the passage from column 4, line 51 through column 5, line 21, which is referenced herewith in its entirety and which belongs to the disclosure of this protective right). The aim is always to achieve the greatest possible mass fraction of the adsorbent in the adsorber element and at the same time to ensure both a very good heat conduction from the adsorbent to the outer surface of the adsorber element (i.e., to the fluid-tight foil composite) as well as to enable a rapid diffusion of the vaporous adsorbate into the total volume of the adsorber element. In particular when the mass transfer (that is, the diffusion of the adsorbate vapor to the adsorbent) becomes the limiting factor for the adsorption kinetics of an adsorber element cooled from outside, as can be the case, e.g., due to the subsequent penetration of granular adsorbent, it is wise to provide the adsorber element specifically with channels for the vapor transport.

The heat-conducting solid body according to the invention can also have a layer of the sorption material on its outer surface (in the areas in which—via the fluid-tight foil composite—no contact with the heat transfer fluid is provided). In the case of non-open-pore solid bodies, this is the only arrangement possibility of the sorption material; if the heat-conducting solid body is open-pore, the sorption material can be arranged on its inner and/or outer surface. Outer surface is to be understood hereby to mean the surface of the solid body that is not an inner surface, i.e., in particular is not formed by the pores of the solid body.

If the heat-conducting solid body carries a layer of the sorption material on its outer surface, this outer surface (in particular in the area of the coating), in a particular embodiment, is structured in such a way that this structured outer surface is greater by at least a factor of 1.4 than the plane of the corresponding flat body forming the outer surface. If, for example, a flat surface is replaced by a surface in which parallel grooves are embossed into this surface, which grooves have a cross section in the shape of a saw profile in which each "sawtooth" has the shape of an equal-sided, right-angled triangle, this factor is about 1.41. The structured outer surface therefore resembles in particular the surface structure of corrugated cardboard; the cross-section through a surface structured in this way gives in particular a saw profile, a right-angle profile, a sinus profile, or the like. Surface-enlarged structures, e.g., by means of fiber structures or powder structures that can be sintered, welded, or soldered with the surface of the solid body, can also be applied on the outer surface. The geometry of the structured surface is generally not essential; rather, it is essential that the increase in surface is maximized in comparison with the unstructured plane.

The fluid-tight foil composite can be connected to the heat-conducting solid body by adhesive force, in that, for example, an adhesive force connection takes place by means of a binder (in a particular embodiment, a binder is selected here that has a high thermal conductivity, e.g., a binder therefore that contains finely dispersed metal particles, carbon or other particles that ensure a sufficient thermal conductivity) or in that the foil composite is sintered onto the heat-conducting solid body (as an example, the sintering onto a metallic solid body is to be named here, in which a foil composite is used that contains a metal layer comprising copper, facing the solid body).

A foil composite connected to the heat-conducting solid body by adhesive force has the advantage that it retains the shape, clinging to the heat-conducting solid body under all pressure conditions.

The foil composite can also be applied onto the open-pore solid body by means of a vacuum-packing method. As vacuum-packing methods for applying the fluid-tight foil composite to the heat-conducting solid body, in principle all commercially available methods (e.g. food packaging methods) are conceivable according to the invention.

Alternatively, the foil composite can be applied onto a—in particular open-pore—solid body, in that the foil composite is arranged (e.g., in a cavity) such that it corresponds at least partially to the outer shape of the heat-conducting solid body. The heat-conducting, in particular open-pore solid body or a preceding stage thereof (e.g., loose or already partially sintered metal fibers, in particular also fibers that contain copper) can then be arranged on the foil composite arranged in this way. Subsequently, the foil composite and the heat-conducting, in particular open-pore solid body or a preceding stage thereof can be connected together by adhesive force (e.g., by means of a sintering method), so that the heat-conducting, in particular open-pore solid body is formed at the latest by means of this connection. Subsequently or alternatively the foil composite or the ends of the foil composite (as soon as the sorption material is also contained) can be sealed, so that a shape-stable adsorber element is formed.

On the one hand, the foil composite can be applied directly onto the heat-conducting solid body, in particular if the design principle is orientated to the fact that the fluid-tight foil composite is understood primarily as a boundary for the adsorbate/adsorbent/heat-conducting solid body structural unit. In this case several adsorber elements can then be arranged so that the heat transfer fluid can flow around them in any arrangement.

Alternatively, the foil composite can have a geometric shape like a cuff or a tube in particular when the design principle is orientated to the fact that the fluid-tight foil composite is primarily understood as a boundary for the heat transfer fluid structural unit. In this case the geometric shape of the foil composite is stipulated such that one or more partial areas of the foil composite thus present can be connected to the outer surface of the heat-conducting solid body positively, non-positively or by adhesive force.

A foil composite that has a geometric shape like a tube or a cuff, is hereby understood in particular to mean that either two facing (cut) edges of a (e.g., right-angled) layer of a foil composite are connected (e.g., sealed) to one another such that a tube-like or cuff-shaped structure is formed or that two layers of the foil composite arranged on top of one another corresponding together to two facing sides are connected respectively (e.g., sealed) at the (cut) edges lying on top of one another.

Such a design principle has the advantage that the volume of heat transfer fluid used can be minimized (in contrast, the area of the fluid-tight foil composite can be maximized in the preceding variant). For example, a channel structure can be embossed on the outer surface of a first heat-conducting solid body, which channel structure leads to a flowing-through of the entire area of the tube-shaped or cuff-shaped foil composite with low pressure loss. Usually a foil composite embodied in this way is inserted or clamped between the outer surface of the first heat-conducting solid body and the outer surface of a second heat-conducting solid body or another boundary surface (e.g., a surface that serves as the outer wall of a heat pump), so that at latest when a positive pressure is applied on the side of the heat transfer fluid, the fluid-tight foil composite adapts itself to the surface structure of the open-pore solid body and thereby, e.g., a channel structure for the heat transfer fluid is formed. The fluid-tight foil composite can hereby be pre-embossed so as to fit precisely in order to adapt itself optimally to the structures in the outer surface of the heat-conducting solid body and is usually not connected to the solid body by adhesive force. While heat transfer fluid under pressure is flowing through, the inflating (and possibly bursting) of a foil composite arranged in this manner is prevented by outer stabilizing elements, in particular by the heat-conducting solid bodies or boundary surfaces arranged on both sides of the fluid-tight foil composite. In areas in which the solid body not stabilized from outside, the force distribution can also be improved, e.g., through sealing seams of the bag.

If the design principle is orientated to the fact that the fluid-tight foil composite is to be understood primarily as a boundary for the heat transfer fluid structural unit, no subsequent accesses for the transport of the adsorbate to the heat-conducting, in particular open-pore, solid body need to be created. Such an arrangement furthermore has the advantage during the construction of the adsorber element of enabling very large flow cross-sections to be provided for the vapor transport of the adsorbate. Thus, e.g., on the side of a heat-conducting solid body facing away from the fluid-tight foil composite, spacers can be mounted or integrated into the solid body, e.g., in the form of a grid or a corrugated metal plate; optionally the surface of this spacer—as described above—can then be structured such that it is larger at least by a factor of 1.4 than the plane of the corresponding flat body, which plane forms the outer surface. By these means a broad vapor transport channel to the surface of the open-pore or non-open-pore heat-conducting solid body can be created. Additionally such adjacent (e.g., also arranged in mirror image) adsorber elements can be held at a distance against the positive pressure of the heat transfer fluid.

In general, the preceding alternative has the advantage that no large barriers for the transport of the vaporous adsorbate are present, as is the case with the variants with adsorbate channels described further above (the barriers are formed in these from the long transport paths inside the optionally open-pore structure and/or through the bottlenecks at the passages through the covering through the vacuum-tight foil composite). In order to enable a very rapid heat transfer into the adsorber elements (and out of these), the thinnest possible plates of the heat-conducting, in particular open-pore, solid body should be used. In the variants with adsorbate channels, however, the use of thin plates means that at the same time only a small flow cross-section can be realized for the vaporous adsorbate, so that a good heat conduction is gained through high pressure losses and with low plate thicknesses, the vapor transport becomes the limiting factor for the adsorption kinetics and thus for the power density of an adsorber constructed in this way. Also with these variants with the use of a quite large number of thinner plates instead of fewer thicker plates, a larger expenditure is required for the fluid-tight (vacuum)-packing of the adsorber elements (e.g. smaller T-shaped sealing points of the fluid-tight foil composite) and a larger structural expenditure (producing the adsorbate channels; needed sealing elements).

If the foil composite has a geometric shape like a cuff or a tube, the remaining facing (cut) edges (that represent the beginning or the end of this tubular structure) not yet connected to one another can also be connected together (e.g., sealed), so that a structure like a bag for fluids is formed (somewhat like a blood bag or infusion bag), in which at least one connection through which the heat transfer fluid can flow into the bag and one connection through which the heat transfer fluid can flow out of the bag, are maintained or are subsequently attached. The connections for the heat transfer fluid can be arranged as for blood bags, but they can also be situated at diagonally opposite corners (Tichelmann connection).

The use of a bag-shaped foil composite with connections has the advantage that with parallel connecting of adsorber elements, the pressure loss of the heat transfer fluid that occurs as it flows through the foil composite, is particularly low. Then the individual channels for the heat transfer fluid can be designed with a smaller hydraulic diameter, so that the heat transfer on the fluid side improves.

In a further advantageous embodiment, the surface of the fluid-tight foil composite and/or the outer surface of the heat-conducting solid body lying below it is structured such that a turbulent flow can form in the heat transfer fluid flowing past it. If the outer surface only of the heat-conducting solid body is structured correspondingly, the foil composite and the structure of the outer surface must be selected so that during the connection of heat-conducting solid body and foil composite, the surface of the foil composite adapts to that of the solid body. The promotion of turbulence through a rough surface is described in fluid mechanics, e.g. through the grit roughness. An adsorber element structured in this manner has the advantage that a better heat exchange with the heat transfer fluid is possible. According to the invention adsorber elements are suitable in particular in which the fluid-tight foil composite adapts to the surface roughness of the heat-conducting solid body (or has the same or only slightly different surface roughness) and thus has a surface structure that promotes a turbulent flow in the heat transfer fluid flowing past it.

Since at the same time the heat transfer is to be maximized and the pressure loss in the hydraulic circuit of the heat transfer fluid is to be minimized, there is an optimization problem. The calculation methods available according to the prior art to solve this problem are to be found e.g., in the VDI-Wämeatlas (Springer-Verlag, Berlin, ISBN 3540255036, 10th edition, January 2006).

The surface of the fluid-tight foil composite and/or the outer surface of the heat-conducting solid body lying below it can also be embodied such that "dimple-like" and/or groove-like and/or slit-shaped depressions are present. Groove-like depressions can for example also cross edges of the adsorber element (in particular with rectangular-shaped adsorber elements), i.e., can run over two or more areas that extend in different directions in space. These dimple-shaped or groove-shaped depressions can already be present on the surface of the heat-conducting solid body (or the solid body can be produced specifically so that these are formed), but they can also be present exclusively or additionally on the surface of the fluid-tight foil composite.

An advantage of dimple-shaped depressions is the development of turbulent flows and thus an improved heat exchange with the heat transfer fluid. An advantage of groove-shaped depressions is that with these the fluid amount relative to the heat to be absorbed can be minimized. I.e., the ratio between the surface of the heat-conducting solid body and the volume of the heat transfer fluid can be increased, and the COP rises. A minimization of the fluid amount can be achieved in that the adsorber element in a heat pump or refrigerator is arranged such that the heat transfer fluid flows past the surface of the adsorber element such that it flows essentially or exclusively through the groove-shaped depressions. The hydraulic diameter of these depressions/channels should be smaller than 3 mm according to a particular embodiment.

In an advantageous embodiment, the groove-shaped structure can also be based on bionic principles, such as are described e.g., in EP 1525428 B1, which leads to a uniform flow through the entire area of the fluid-tight foil composite at low pressure loss.

In a further advantageous embodiment the surface of the fluid-tight foil composite and/or the outer surface of the heat-conducting solid body lying beneath it is structured such that it can be used in conjunction with a two-phase flow of the heat transfer fluid, as is known from the "heat pipes" technology (cf. for this, e.g., G. P. Peterson, "An Introduction to Heat Pipes—Modeling, Testing and Applications", John Wiley & Sons, 1994). In particular the stated surface can be structured with fine grooves. Grooves of this type can, for example, be applied by means of a calendering method. It is possible, for example, to structure a support layer present in the foil composite (before the application of further layers) or to apply a separate structuring layer that already has the structuring or to subject the not yet structured structuring layer already contained in the foil composite (together with the foil composite) to a surface structuring method (e.g., in that the structuring is embossed by means of a structure roll). In a particular embodiment, the surface of the fluid-tight foil composite is embodied such that the grooves essentially run parallel and are arranged such that they can run essentially vertically when used in a heat exchanger or a refrigerator.

The capillary effect that causes the transport of the heat transfer fluid in the fluid phase can be supported by a coating of the surface of the fluid-tight foil composite with a suitable wicking material or else can be realized exclusively by means of a wicking material. This can be any wicking material used according to the prior art for "heat pipes", e.g., a polymer with pores in the micrometer range (as described, e.g., in U.S. Pat. No. 4,765,396), which is already applied during the production process of the foil composite, or, e.g., a thin zeolite layer on the foil composite. In a particular embodiment, the wicking material comprises a material that connects well with the fluid-tight foil composite (e.g. comprises a polymer that has similar properties to the surface of the foil composite).

In all cases, it is required that the respective capillary structure be embodied such that (according to the "heat pipes" principle) an evaporation of the heat transfer fluid through heat given off by the adsorber element is possible.

When adsorber elements of this type are used in a "heat pipe", the heat transfer fluid then does not flow around the adsorber elements; rather, in the fluid phase it is "drawn along" the adsorber element through the capillary action of the groove-shaped depressions or the wicking material and is evaporated by heat input. For the vapor transport suitable channel structures according to the invention must then be provided, as are known from the prior art for heat pipes. For example, vapor channels can be provided for this, which vapor channels are formed by two adsorber elements arranged adjacent to one another.

The embodiment described above, that the fluid-tight element has a surface condition with which a suitability for a use in a "heat pipe" can be realized, represents an own invention (independent of a combination of the feature of the "surface condition of the fluid-tight element" with the feature that an open-pore solid body must be contained). Advantageous embodiments of this invention are given from the features of the subordinate claims (without the respective dependencies being valid hereby).

In an advantageous embodiment the adsorber element according to the invention has a geometric shape like a rectangle, a spiral, or a hollow cylinder. Adsorber elements with a geometric shape like a rectangle have a substantially smaller extension in one direction than in the two other directions in space according to a particular embodiment; this also holds true for shapes derived from such a rectangle, such as a spiral or hollow cylinder. According to the invention hereby a geometric shape like a rectangle in addition to pure rectangles is also understood to mean any geometric shape that results in a rectangle through the effect of force in a direction of space, without considerable changes in the size of the surfaces of the rectangle taking place (in particular stackable geometric bodies are to be named, furthermore groove-shaped or bowl-shaped deformed rectangles or else rectangles with convex and/or concave outer surfaces or partial surfaces also fall under this). The geometric shape of these adsorber elements like a rectangle therefore, in a particular embodiment, approaches the shape of a thin plate (this holds true—as mentioned—also for the hollow cylinder that is derived from a plate whose ends were "twisted" with respect to one another respectively by 180° and holds true likewise for a spiral-shaped adsorber element that is derived from a "rolled-up" plate). Decisive for the shape of the adsorber element is that forming heat has a shortest possible path to the outer surface of the adsorber element, where it is dissipated to the heat transfer fluid via the fluid-tight foil composite. If the adsorber element is a hollow cylinder, the feed of the adsorbate can also take place in the interior of the hollow cylinder.

In a particular embodiment, the adsorber element with a geometric shape like a rectangle has a geometry in which the three respectively facing pairs of surfaces of the rectangle fulfill the following conditions: The first facing pair of surfaces, in a particular embodiment, has an average spacing of 1 mm to 30 mm, or, in a more particular embodiment, 0.4 to 20 mm, or, in an even more particular embodiment, 1 to 8 mm. The second and the third facing pairs of surfaces of the rectangle have an average spacing that is greater at least by a factor of 4 and, in a particular embodiment, at least by a factor of 10, than that of the first pair of surfaces. In a particular embodiment, the surface of the two largest lateral surfaces of the geometric shape like a rectangle is respectively larger than the rectangle of the average spacing of these surfaces at least by a factor of 16, or, in a more particular embodiment, at least by a factor of 50, and, in an even more particular embodiment, at least by a factor of 100.

An adsorber element embodied in this manner has the advantage that the path that the heat must travel from the sorption material to the outside of the adsorber element (i.e., to the outside of the fluid-tight foil composite), can be minimized.

In an advantageous embodiment the adsorber element according to the invention with a geometric shape like a rectangle, a spiral, or a hollow cylinder has groove-shaped and/or dimple-shaped and/or slit-shaped depressions in the heat-conducting solid body to which the fluid-tight foil composite clings. By these means the thermal path can be further reduced. A possibility of the particularly good utilization of the total volume with a very short thermal path is to arrange these groove-shaped and/or dimple-shaped and/or slit-shaped depressions such that the projections lying between two depressions can engage in the depressions of an adjacent adsorber element with the same type of surface structure, so that the two adjacent adsorber elements engage in one another like two combs and between the adsorber elements a rolled, also narrow in a particular embodiment, split remains free for the heat transfer fluid. A surface structure of this type, which can be for example corrugated or comb-like, can be present on one or more surfaces on one or both surfaces of the pair of surfaces with the smallest average spacing according to a particular embodiment.

The heat-conducting, in particular open-pore solid body used in the adsorber elements according to the invention, is composed of a metal and/or a ceramic or contains a metal and/or a ceramic according to exemplary embodiments of the invention. According to the invention, therefore, the heat-conducting solid body can also be understood to mean a solid body based on a metal (or an alloy), which for specific applications contains admixtures, such as, e.g., ceramic particles; likewise it can be understood to mean a ceramic heat-conducting solid body that for specific applications contains ceramic or non-ceramic admixtures (e.g., metallic particles to increase the thermal conductivity). In general, the solid body should have the highest possible thermal conductivity.

If the heat-conducting solid body is a non-open-pore solid body, it should have a thermal conductivity greater than 30 W $m^{-1}K^{-1}$, according to a particular embodiment or, according to another particular embodiment, greater than 150 W $m^{-1}$ $K^{-1}$.

If the heat-conducting solid body is an open-pore solid body, however, it should at the same time have the highest possible porosity. The skeleton material of the open-pore solid body, in a particular embodiment, should have a thermal conductivity greater than 30 W m$^{-1}$ K$^{-1}$ or, in a particular embodiment, greater than 150 W m$^{-1}$ K$^{-1}$. The open-pore solid body as such should, in a particular embodiment, (in particular in the direction perpendicular to the contact surface with the foil composite) have a thermal conductivity greater than 6 W m$^{-1}$ K$^{-1}$. With an anisotropic structure of the open-pore solid body, the thermal conductivity should be highest along the shortest path to the heat transfer fluid.

If a heat-conducting solid body of ceramic or based on a ceramic is used, e.g., aluminum nitride and/or silicon carbide can be used for this.

In a particular embodiment, the heat-conducting solid body comprises metal or contains a metal. In particular examples according to the invention, the metal is selected hereby from aluminum, copper, silver, and alloys of these elements, since these have a particularly high thermal conductivity.

In a variant, reinforced metal matrices, in particular copper matrices, are used as metal-containing open-pore solid bodies with carbon fibers, such as short carbon fibers, which matrices excel through adaptable temperature expansion behavior and high thermal conductivity. In particular embodiments, such composite materials have 30-65% by volume carbon fibers, wherein depending on the consolidation method, various orientation distributions of the fibers can be established in the metal matrix.

If a metallic body, in particular a porous metallic body is used as a heat-conducting solid body, it can be produced in particular by powder metallurgy methods, sintering methods, screen-printing methods, and/or casting methods.

A powder-metallurgical production of an open-pore metallic body can take place, e.g., in that porous structure elements comprising an organic material (which have the structure of the later embodied pores) are acted upon by a metal powder or metal powder mixture, and subsequently are subjected to a thermal treatment, wherein (usually in a first stage) the organic material is expelled. Usually the production of the porous metallic body then takes place in a second stage by sintering. Alternatively a deposition of metals on the surface of the organic material can also take place (for example, a deposition from the gas phase, e.g., with nickel). The porous structure element comprising organic material can for example also be a body comprising (optionally under pressure) spherical structures (for example polystyrene balls) sintered together. The powder metallurgy route can also be used for the production of open-pore ceramic materials; hereby the organic base body must then be coated with ceramic powder particles and then be sintered, wherein the organic component is expelled.

An open-pore metallic structure can be obtained by means of a screen-print method, in that a layer-wise build-up of the structure takes place through screen printing. The structuring is undertaken hereby through mask variation. Usually a subsequent debinding- and/or sintering step is necessary after the layer-wise generation of the structure. An open-pore structure can be produced with this method that is independent of the structure of an organic (structure-forming) base material; it can also be used for the production of ceramic open-pore solid bodies.

In a particular variant, the heat-conducting, in particular open-pore, solid body is produced at least partially by means of a casting method. Hereby in particular a casting method is advantageous in which an organic material reproducing the pore shape is introduced into a casting mold, which is subsequently infiltrated with a metal melt or a metal-containing melt. For example, an aluminum pressure die casting method is cited in which an aluminum melt is pressed very quickly into a cooled mold that contains granules of a polymer material that displaces the melt and thus leads to the porous structure of the cast component. After the metal melt or metal-containing melt has solidified at a temperature below the melt temperature of the metal (or the liquid temperature), the organic material (or the polymer granules) is melted out. In a particular embodiment, the casting method is carried out such that an infiltration of the polymer granules takes place without their melting-out. For example, polystyrene is cited as a possible material for the polymer granules. As the metal melt, in a particular embodiment, a melt with a melting point that is lower or the same as that of aluminum, is used; melts of aluminum (e.g., technically pure, i.e., 99.7% aluminum) or aluminum alloys are used in a particular embodiment. The casting method, according to a particular embodiment, is a pressure die casting method; however, a precision casting method, for example, is also conceivable according to the invention. The use of a casting method with melt infiltration has the advantage that by means of the organic material contained therein, it can be determined exactly which surface condition and which pore structure the open-pore solid body possesses. Furthermore, gradients can be established in the pore structure, channels that run through the open-pore solid body can be recessed, and solid structure elements that serve the mechanical stability of the open-pore solid body or of the adsorber element can be provided. A particular method of the production of the open-pore solid body by means of a pressure die casting method, according to the invention, comprises inserting the polymer body to be infiltrated into one of the halves of the casting cavity in the metallic casting die of the pressure die casting equipment and subsequently infiltrating with modified parameters of the pressure die casting process. Elevations and fixing elements for any vapor transport channels as well as elevations for groove-shaped or dimple-shaped depressions or other structurings of the solid body surface are contained in the casting mold according to a particular embodiment of the invention. It is also conceivable thereby to produce the open-pore solid body or the adsorber element from several parts respectively produced by means of a pressure die casting method. However, the pressure die casting method is carried out, according to a particular embodiment, such that the open-pore solid body (optionally with structure elements contained therein) is produced in one piece.

An open-pore metal-containing solid body can also be obtained through a sintering of metallic or metal-containing fibers. As metal fibers, in principle fibers of all metals are suitable. Fibers with the highest possible thermal conductivity should therefore be selected. Fibers of an AlCuZn alloy are cited by way of example. Here too channels can be provided in that appropriately shaped organic materials that can later be melted out, are contained as place-holders during the structure-forming sintering process. An alternative way of introducing channels is to sprinkle fibers on a mold whose surface already contains a negative of the desired structures, and then to sinter this pre-shaped fiber mat. Here too solid structure elements can be obtained by introducing appropriate solid components (in particular metal parts). When short fibers in the length range of 3 to 25 millimeters are used, an anisotropy of the open-pore solid body structure can be established that leads to reduced flow losses and can thus be advantageous for the loading of the element (in particular the flow losses in the longitudinal direction with rectangular-shaped adsorber elements are reduced).

In an advantageous embodiment, the heat-conducting open-pore solid body contained in the adsorber element according to the invention has the highest possible specific surface area. This ensures that the heat transfer from the sorption material via the open-pore solid body to the fluid-tight foil composite and its heat transfer fluid can take place particularly efficiently. The specific surface area of the open-pore solid body is therefore greater than 2,500 $m^2/m^3$ in a particular embodiment, such as greater than 10,000 $m^2/m^3$, and, according to a further embodiment, greater than 25,000 $m^2/m^3$. The specific surface area is hereby determined by means of X-ray computer tomography and subsequent image analysis.

If the heat-conducting solid body has an outer surface coated with sorption material, which surface is structured such that this structured outer surface is greater at least by a factor of 1.4 than the plane forming the outer surface of the corresponding flat body, the portion of the specific surface area pertaining to this structured surface also has a value increased by this factor compared to the flat body.

According to a particular embodiment of the invention, whereby the heat-conducting solid body is open-pore, the solid body is traversed by one or more transport channels for the adsorbate; these channels should have at least a diameter such that an orientated flow still prevails therein even with the lowest use-relevant vapor pressure, i.e. no Knudsen diffusion. In a particular embodiment, in particular when the design principle of the adsorber elements is orientated towards the fluid-tight foil composite being understood primarily as a boundary for the adsorbate/sorption material/heat-conducting solid body structural unit, the transport channels branch in a fractal structure, as is known from the solution of flow problems in nature (e.g. in leaves of plants, see, e.g., Strasburger Lehrbuch der Botanik, ISBN 3827413885, Spektrum Akademischer Verlag, 2002). The fractal channel structure for the transport can, e.g., be embossed into the casting mold during a production of the open-pore solid body by means of a casting method.

The adsorption heat pump or adsorption refrigerator according to the invention contains at least one adsorber element that includes a heat-conducting solid body and a sorption material arranged on the surface of this solid body for a vaporous adsorbate, wherein a fluid-tight foil composite is arranged on the outer surface of the heat-conducting solid body, at least in the areas in which a contact with a heat transfer fluid is provided. The at least one adsorber element is embodied thereby such that the heat exchange between the heat-conducting solid body and the heat transfer fluid can take place via the fluid-tight foil composite. Usually the adsorption heat pump or adsorption refrigerator according to the invention furthermore contains an evaporator, a condenser (wherein also a component is possible that functions both as an evaporator and as a condenser).

If the design principle of the individual adsorber elements or of the heat pump or refrigerator is orientated towards the fluid-tight foil composite being understood primarily as a boundary for the adsorbate/sorption material/heat-conducting solid body structural unit, the heat pump or the refrigerator usually also have a vacuum-tight (but at least fluid-tight) adsorbate channel that is connected via connections to the adsorber element, the evaporator and the condenser. The adsorber elements packaged in a fluid-tight manner are then usually arranged in a container such that the heat transfer fluid flows around them in as full-surface a manner as possible, and the container limits the space that the heat transfer fluid occupies.

On the other hand, if the design principle is orientated towards the fluid-tight foil composite being understood primarily as a boundary for the heat transfer fluid structural unit, an adsorbate channel is not absolutely necessary. The adsorbate channel can be omitted in particular when the at least one adsorber element, the condenser and the evaporator are arranged in the same shell (or the same housing), since the vapor of the adsorbate can flow towards the adsorber element from all sides. The adsorber elements are then usually arranged in a container such that the vaporous adsorbate can come into contact as simply as possible with the sorption material arranged on the surface of the heat-conducting solid body and the container limits the space that the vaporous adsorbate occupies.

During the operation of the heat pump or refrigerator, the heat transfer fluid (e.g., water, a water/glycol mixture or in the case of a two-phase flow, e.g., also methanol) flows round the adsorber elements or the fluid-tight foil composite applied onto their outer surface, and thus they are heated during the desorption phase and cooled during the adsorption phase.

A particular use of the adsorber elements according to the invention is the use in an adsorption refrigerator or adsorption heat pump, in which a traveling temperature gradient ("thermal wave") is generated in the heat transfer fluid. For this an arrangement with at least two adsorber units that respectively contain at least partially the adsorber elements according to the invention, is required. With these "thermal wave" methods a major part of the sensible heat stored in the thermal mass of the adsorber units or adsorber elements can be exchanged between the two adsorber units. At the end of this "thermal wave" process the two adsorbers do not have the same average temperature; rather, the originally hot adsorber (that was previously desorbed) has a distinctly lower temperature than the originally cold adsorber (which has previously adsorbed). The "thermal wave" method is disclosed, e.g., in U.S. Pat. Nos. 4,610,148 and 4,694,659. A great variety of proposals have been made in the past for realizing the "thermal wave" process. Up to now, however, no arrangement of the adsorber elements has been proposed that realizes this "thermal wave" principle and that enables a simple adsorber construction that is not prone to malfunction and is cost-effective. With a heat pump or refrigerator in which the adsorber elements according to the invention are connected in series, this is now possible for the first time; therefore for the first time an efficient heat recovery according to the "thermal wave" principle is realizable.

In an advantageous embodiment for the variant in which the fluid-tight foil composite is to be understood primarily as a boundary for the adsorbate/sorption material/heat-conducting solid body structural unit, two adjacent adsorber elements respectively of the heat pump or refrigerator according to the invention are connected by means of at least one adsorbate channel, wherein at least one adsorbate channel to which two adjacent adsorber elements are connected, is arranged on an axis on which further adsorbate channels of further adsorber element pairs are situated. In a particular embodiment of the invention, all or at least most of the adsorbate channels are situated on those axes that run through the entire adsorber element stack.

An arrangement of this type has the advantage that only a compression of the stack of adsorber elements and adsorbate channels along the axis of the adsorbate channels is necessary for the vacuum-tight connection of the adsorbate channels to the adsorber elements. Sealing elements that seal along the adsorbate channel axis when pressure is exerted, can additionally be provided hereby. Furthermore, in adsorber element/adsorbate channel stacks of this kind (with or without sealing elements), the adsorber elements are embodied, in a particular embodiment, such that at the points at which (through the compression of the stack) the contact pressure arises, are mechanically so stable that they withstand this contact pressure.

In order to achieve the vacuum-tight connection of the adsorbate channels to the adsorber elements in the adsorbate channel/adsorber element stack described above or to generate the contact pressure necessary for this, a holding element can be provided in the heat pump or refrigerator according to the invention that runs inside the adsorber elements through the adsorbate channels arranged on an axis. Alternatively, the holding element can also run completely outside the adsorber elements. At the ends of this holding element, means must be provided with which the necessary contact pressure can be generated, so that the vacuum-tight connection of adsorbate channels and adsorber elements can be realized.

In a further advantageous embodiment, two or more adsorbate channels (three, in a particular embodiment) that do not lie on a straight line are situated between two adjacent adsorber elements. If each adsorber element of an adsorber element/adsorbate channel stack is connected to at least three vapor channels (or if both sides of an adsorber element are counted, six vapor channels), which vapor channels do not lie on a straight line running crossways to the stack, the danger of leakages of the adsorber element/adsorbate channel stack due to the canting of individual adsorber elements is greatly reduced.

In a further embodiment, the heat pumps or refrigerators according to the invention contain at least partially adsorber elements that have a geometric shape of a rectangular type. In a particular embodiment, the average spacing between two adjacent adsorber elements of this type is less than the average spacing between the first surface pair facing one another of the geometric body of a rectangular type (which again is less than the spacing between the second and third surface pairs facing one another of the geometric body of a rectangular type). In a particular embodiment, the average spacing is less than 20 mm. This spacing can be established, e.g., by means of spacers (for example, also in the form of adsorbate channels and/or sealing elements); however, these are not absolutely necessary if the foil composite has a geometric shape like a cuff or a tube.

The smaller the spacing between adjacent adsorber elements, the higher the tendency to develop a turbulent flow in the heat transfer fluid and the better the heat transfer from the adsorber element to the heat transfer fluid. However, the pressure loss in the hydraulic circuit of the heat transfer fluid is also higher thereby. Usually an average gap width of 0.5 mm to 5 mm is therefore wise. With special embodiments this can also be larger (up to 30 mm). If a foil composite with a geometric shape like a cuff or a tube is used, the extent to which the foil bag can inflate is determined by an outer enclosure of the adsorber element or a stack of them. In a particular embodiment of this variant, the adsorber elements are pressed together by an outer stable frame such that the foil bag or the foil tube are clamped between each two adsorber elements and channels for the heat transfer fluid can develop only in the area of the recesses in the solid body of the adsorber elements in the bag/tube. Although the pressure loss here will generally be greater than in the case of a full-surface flow-around, the flow distribution can be controlled considerably more precisely and the total amount of heat transfer fluid in the adsorber circuit can be reduced.

In the heat pumps or refrigerators according to the invention, several adsorber elements are contained according to a particular embodiment, such as exclusively adsorber elements, that are approached or can be approached by the flow of the heat transfer fluid in series and/or parallel. In a particular embodiment, the adsorber elements then have a geometry like a rectangle, such as plate-shaped.

In an advantageous variant the adsorber elements in the heat pump or refrigerator according to the invention are arranged in the shape of an adsorber element stack like a comb. The adsorbate channel (through which the vaporous adsorbate is led to the adsorber elements) can run in the "back" of the comb thereby. This is wise in particular when the heat transfer fluid does not flow through a foil composite a geometric shape like a cuff or a tube. A serial approach flow to the adsorber elements by the heat transfer fluid can be realized here particularly simply. Two adsorber element stacks like a comb are positioned with respect to one another hereby such that the "tips" of the combs engage in each other and the heat transfer fluid can therefore flow through this arrangement in the shape of a meander. Additionally, the adsorber element stacks—also with parallel flow-round—can contain at least partially (or, in a particular embodiment, exclusively) respectively adjacent adsorber elements with groove-shaped and/or dimple-shaped and/or slit-shaped depressions that are arranged such that the projections of the one adsorber element lying between two depressions can engage in the depressions of the adjacent adsorber element with the same type of surface structure, so that also these adjacent adsorber elements can engage in one another like two combs.

If a foil composite with a geometric shape like a cuff or a tube is used in an arrangement in which two adsorber element stacks like a comb are positioned such that the heat transfer fluid can flow through the arrangement in the shape of a meander, this tube can be arranged between the adsorber element stacks like an accordion folding. The same arrangement is also possible when the adsorber elements are only arranged one on top of the other like a paper stack. In both cases (e.g., tubular) adsorbate channels running along the bend or deflection point can be arranged along the sides of the adsorber element at which the accordion folding has a bend or deflection point. By these means it is on the one hand possible to protect the heat transfer fluid tube from damage at the bends or deflection points (for instance during installation), and on the other hand a yet better distribution of the adsorbate is possible, in particular with open-pore solid bodies.

A similarly advantageous arrangement can be realized with adsorber elements with a spiral geometry (i.e., that the adsorber element is derived from a "rolled-up" plate), in that a heat transfer fluid tube that is then likewise spiral in shape, is arranged between the branches of the spiral.

Also independent of the use of a foil composite with a geometric shape like a cuff or a tube, special fluid routings are possible through the spiral shape, which routings lead to a low total pressure loss when the heat transfer fluid flows through the adsorber element and that will be described below: advantageously at the spiral-shaped rolled-in edges of the adsorber element, heat transfer fluid collecting channels are situated that have a considerably larger flow cross-section than the channels for the heat transfer fluid that run essentially perpendicularly thereto and are embossed into the surface of the solid body. In order to achieve a winding space that is less than the diameter of the collecting channels, a diagonal winding of the adsorber element and/or a geometric shape of the adsorber element with non-parallel running edges can be selected. In a further advantageous embodiment, such an adsorber element has the basic shape of a trapezoid and is rolled up starting from the wider side towards the narrower side, resulting in a cylinder that thickens in the center. In order to achieve a uniform flow-through of the entire surface of the plate, the flow cross section of the channels embossed into the surface of the solid body is to be selected smaller in the vicinity of the narrower edge than in the vicinity of the longer edge, so that the pressure loss of these channels is approximately the same at the same volume flow.

In a particular embodiment, both in the serial and the parallel flow-round of the adsorber elements, the trough surrounding the adsorber element stack should have the lowest possible heat capacity, i.e. for a given material should have the lowest possible weight. In general the heat pumps or refrigerators according to the invention are designed, according to a particular embodiment, so as to maximize the mass fraction of the adsorbent compared to the fraction of the inert mass that must be thermally cycled using sensible heat.

In addition to the above-described comb-shaped arrangement of adsorber element stacks, the heat pumps and refrigerators according to the invention can of course also contain in addition groups of adsorber elements arranged in other ways; moreover it can also have several adsorber units connected together (i.e. units of respectively two or more adsorber element stacks or groups of adsorber elements arranged in other ways) according to the principles described above.

In principle all variants for the connecting of several adsorber element units that are known from the prior art are possible (cf., e.g., M. A. Lambert et al. "A Review of Solid-Vapor Adsorption Heat Pumps", 41$^{st}$ AIAA Aerospace Sciences Meeting and Exhibit, 2003, Reno, Nevada, 2003-0514).

The present invention—without limiting its generality—is explained below in more detail based on drawings. They show.

DETAILED DESCRIPTION OF THE INVENTION

Figure 1:
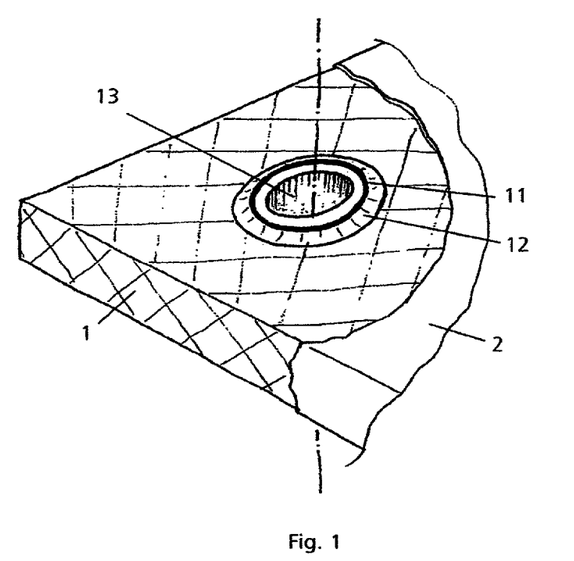
FIG. 1: Section of a profiled adsorber element.

In FIG. 1 a section of an adsorber element is shown in which an open-pore solid body 1 is packaged (e.g., welded) with a composite film 2,(foil composite, hereafter), e.g., by means of a vacuum packing process. For the connection of adsorbate channels 24, a profiling 12 in the form of a circular notch or groove is provided in this adsorber element. A sealing element 11 in the form of a ring can be laid in this groove, so that a vacuum-tight connection with the adsorbate channel 24 can be produced when a contact pressure is applied. In the center of the profiling 12 a hole 13 is bored into the open-pore solid body 1, in order to enable a better distribution of the vaporous adsorbate in the adsorber element or in the open-pore solid body, which is coated with the sorption material. Furthermore, a fastening element can be led through the hole 13, by means of which the contact pressure can be applied to achieve a vacuum-tight connection between adsorber elements and adsorbate channels.

Figure 2:
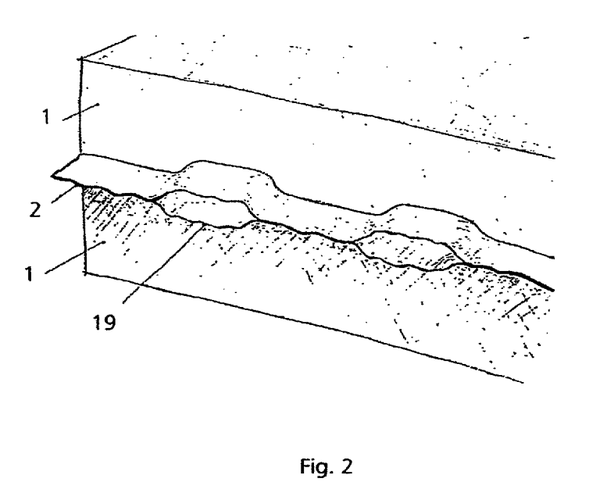
FIG. 2: Section of an adsorber element in which the foil composite is present like a tube or a cuff or a bag.

FIG. 2 shows a section of an adsorber element in which a foil composite 2 with a geometric shape like a tube or a cuff (which however can only be seen in the form of two layers of the foil composite) is arranged between two layers of an open-pore solid body 1. The remaining not yet joined together (cut) edges of the foil composite 2 here project from the solid body 1 and, except in the area of the connections 19 for the heat transfer fluid, are likewise sealed together so that the foil composite has the shape of a bag. The heat transfer fluid can flow into or out of the bag via the connections 19.

Figure 3:
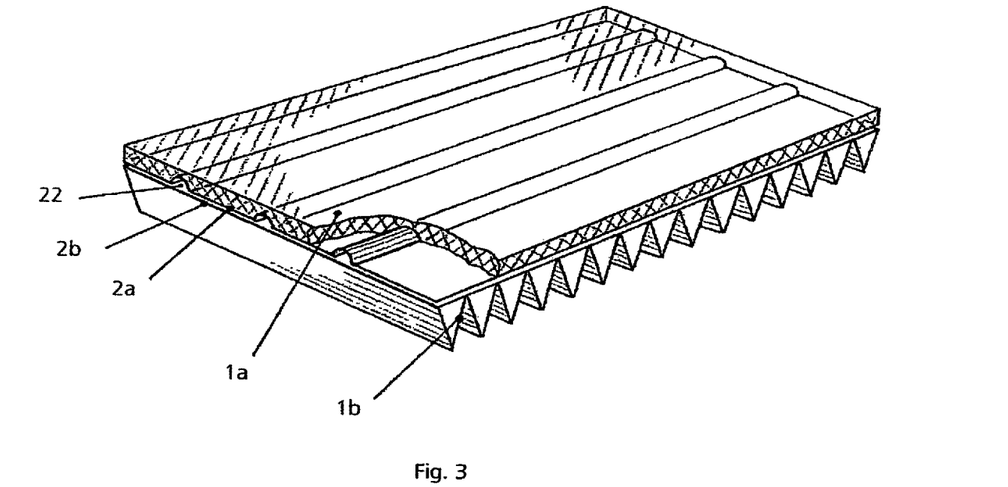
FIG. 3: Combination of an adsorber element based on a heat-conducting open-pore solid body with an adsorber element based on a massive heat-conducting solid body.

FIG. 3 shows a combination of an adsorber element based on a heat-conducting open-pore solid body with an adsorber element based on a massive heat-conducting solid body. In an open-pore heat-conducting solid body 1a, groove-like depressions are provided on the side facing the fluid-tight foil composite 2a. The foil composite 2a is applied onto the open-pore heat-conducting solid body 1a in such a way that it adapts itself to the surface structure or is alternatively structured such that the surface structure corresponds to that of the open-pore solid body 1a. Furthermore, a massive solid body 1b is structured on its side facing away from the fluid-tight foil composite 2b such that a sawtooth profile is formed. A coating with a sorption material is arranged on this side. Sorption material is likewise arranged on the inner and outer surface of the open-pore solid body 1a. Alternatively, as a massive solid body 1b, a metal plate can also be used that is "folded" so that a sawtooth profile is formed. The foil composite 2b is then applied on the side of the massive solid body lb facing the fluid-tight foil composite 2b. Between the layers 2a and 2b of the foil composite (which can also be connected together respectively on the (cut) edges lying on top of one another on the two longer sides facing one another, so that a foil composite with a geometric shape like a cuff or a tube is present), a channel 22 for the heat transfer fluid exists, wherein the latter flows essentially through the groove-like depressions.

Figure 4:
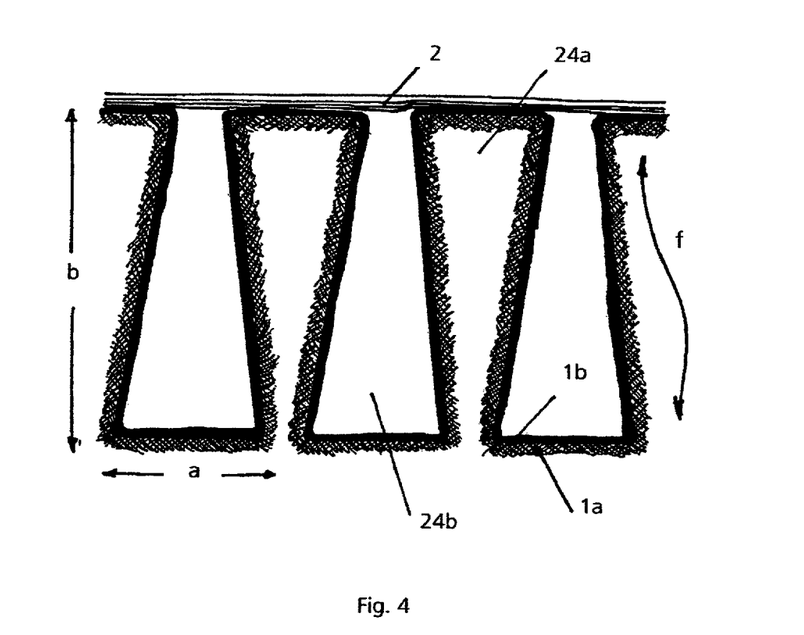
FIG. 4: Section through an adsorber element in which a heat-conducting open-pore solid body are combined with a massive heat-conducting solid body.

FIG. 4 shows a cut through an adsorber element, in which a heat-conducting open-pore solid body is combined with a massive heat-conducting solid body. Here the cut gives a type of rectangular profile. A massive heat-conducting solid body 1b, with a thickness d (such as, e.g., a thickness 15 µm to 250 µm), is coated with a thin layer of fibers of the same basic material, is sintered or soldered (the layer thickness e of the fibers, in a particular embodiment, is in the range of d<e<10*d) according to a particular embodiment, so that an open-pore solid body 1a is arranged on the solid body 1b. The corrugated-metal-type structure of the solid body 1a/1b is obtained in that a flat solid body metal plate is folded such that bridges of the width a towards the foil composite result. The height h of the folded structure is clearly greater than a, in the range of 3*a<b<30*a, according to a particular embodiment. The optimum side ratio also depends on the thickness of the fiber layer in relation to the metal plate thickness (e:d). On the uncoated bridges a foil composite 2 (here shown three-layered; not true to scale) is arranged, which as a rule is connected with adhesive force to the massive solid body 1b.

The thermal conductivity in direction f can be considerably higher than with a homogeneous open-pore solid body (e.g., the fiber structure or 1a in FIG. 2) and depends essentially on the ratio of the metal plate thickness d to the folding distance a ab. The ratio of the thermal conductivity (in the preferred direction) of the solid body obtained in this way to a massive solid body comprising the bulk material of the massive solid body 1b is at least $2d/a$. The fiber layer or the open-pore solid body 1a additionally improves the heat conduction. The fiber layer 1a contributes decisively to the mechanical stabilization of the solid body (in particular bending stiffness), since the solid body must accept the pressure difference between the heat transfer fluid flowing inside a bag formed from the foil composite 2 and the adsorbate vapor pressure on the other side of the foil. This pressure difference is typically between 1.5 bar and 4 bar for low-pressure adsorbates (water, methanol). The pressure stability of the solid body obtained in this way with load in direction f can likewise be considerably higher than with a homogeneous porous solid body of the same porosity or effective denseness. This enables a high porosity and specific surface area of the solid body, through which more sorption material can be introduced and the heat ratio increases in a sorbate/sensible manner in favor of a higher COP. The cavities create obstacle-free flow channels 24a, 24b for the vapor of the adsorbate and thus prevent the adsorption kinetics from being limited through the vapor diffusion. In addition, they make it possible to produce relatively wide adsorber elements without vapor transport limitation. Through the large-area contact of the foil composite with the bridges not coated with fibers, the heat transfer from the solid body 1b to foil is greatly improved and is in particular considerably better than with a homogeneous porous solid body 1a (see FIG. 2).

Figure 5:
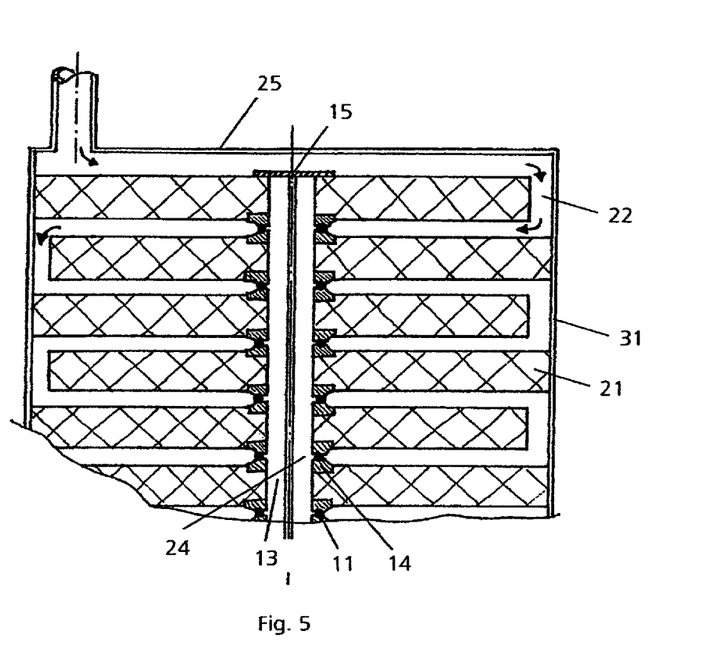
FIG. 5: The construction of an adsorber unit for realizing a "thermal wave" in top view.

FIG. 5 shows a construction of an adsorber unit for the realization of a "thermal wave" in top view. The adsorber elements 21 are combined to produce two adsorber element stacks that together with the boundary 31 respectively form an adsorber element stack like a comb. The respectively adjacent adsorber elements 21 from the two adsorber element stacks have a small spacing from one another, so that the adsorbate channels 24 arranged on an axis between the adsorber elements are only very short (and essentially are formed by the sealing element 11). The two comb-like adsorber element stacks are inserted into a trough 25 (whose side walls form the rear boundary 31 of the comb-like adsorber element stack), through which the heat transfer fluid flows. Through the alternating arrangement of the adsorber element stack, which gives the heat transfer fluid room to flow past respectively only at one side of the trough, the fluid must flow through a meander-shaped channel 22 between all the adsorber elements successively. Through this a temperature gradient can be established along the heat transfer fluid channel axis and thus a "thermal wave" can be realized. A holding element 15 (e.g., a threaded rod) runs through the entire arrangement of adsorber elements 21 and adsorbate channels 24; a hole 13 is provided in each open-pore solid body 1, which hole is situated in the center of the profiling 12 for a sealing element 11. Through the adsorbate channels 24 and the holes 13 provided in the open-pore solid bodies 1, adsorbate can flow into the open-pore solid bodies 1.

Figure 6:
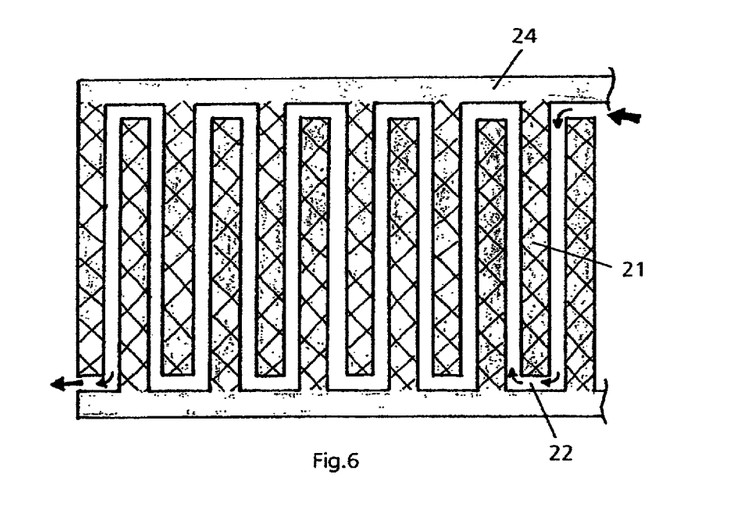
FIG. 6: A further construction for realizing a "thermal wave"

In FIG. 6 the adsorber elements 21 are likewise arranged to form an adsorber element stack like a comb. Here the adsorbate channel 24 runs in the "back" of the comb. The combs are pushed into one another such that a meandering channel results for the heat transfer fluid 22. For this, the individual adsorber elements are applied on the adsorbate channel parallel to one another with the narrow sides, which adsorbate channel can be composed, e.g., of a suitably perforated aluminum double-bridge plate. The spaces between the plates are selected so large that a second "comb" of the same construction can be pushed into the first in mirror image. The combs can be packed in either in a fluid-tight foil composite (which is not shown here) (cf. FIGS. 7a and 7b), or a tube-shaped foil composite (which is not shown here) can be inserted into the channel 22, so that the foil composite is arranged in accordion folds. The channel for the heat transfer fluid 22 then runs between the two combs that have been pushed into one another. If the two combs are pushed into one another so far that they touch each other, only parallel slits remain between the adsorber elements. In this case, a parallel approach flow of the adsorber elements is then realized. If a tube-shaped foil composite is used, the tube must respectively also have a connection for inflow and outflow of the heat transfer fluid between each two adsorber elements.

In any case, the two combs are arranged in a suitable trough for the heat transfer fluid and fixed in their position. The channels for the vaporous adsorbate are connected in a suitable manner (corresponding to the prior art for adsorption heat pumps) to evaporators or condensers of the heat pump via suitable valves. To this end, a vacuum-tight connection between the fluid-tight foil and another massive component (e.g. an aluminum profile part) must be produced for each individual comb structure of adsorber elements only at one or two places (i.e., the "ends" of the comb). A serial or parallel construction of this type is very easy and cost-effective to convert in series production for heat pumps and refrigerators.

Figure 7A:
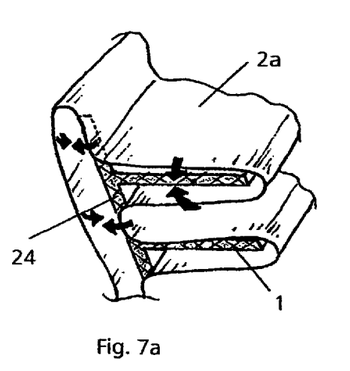
FIGS. 7a, 7b: The application of a foil composite to an e.g. open-pore solid body and an adsorbate channel and the course of the welded seams with an adsorber element stack formed herefrom, in which the individual adsorber elements are arranged like a comb.
Figure 7B:
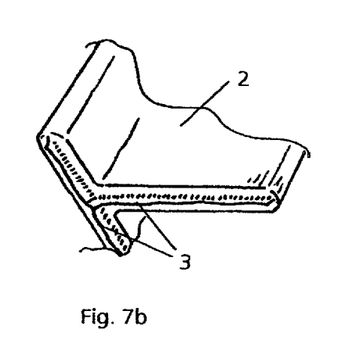

FIG. 7a shows the application of a foil composite onto heat-conducting, in particular open-pore, solid bodies and an adsorbate channel. Here, a comb-like adsorber element stack (as shown, e.g., in FIG. 5) is driven into a web of the foil composite 2 that is so much wider than the comb structure that enough room remains on both sides of the comb to weld the projecting foil composite. FIG. 7b shows the course of the welded seams 3 of the foil composite 2 in a comb-like adsorber element stack. The adsorber elements (i.e. the heat-conducting solid body 1 and the adsorbate channel 24) are fully enclosed by the fluid-tight foil composite 2 after the welding. At the points at which an adsorber element meets the collecting channel, two welded seams then meet each other in the shape of a T, i.e., a T-shaped vacuum-tight connection results.

Figure 8A:
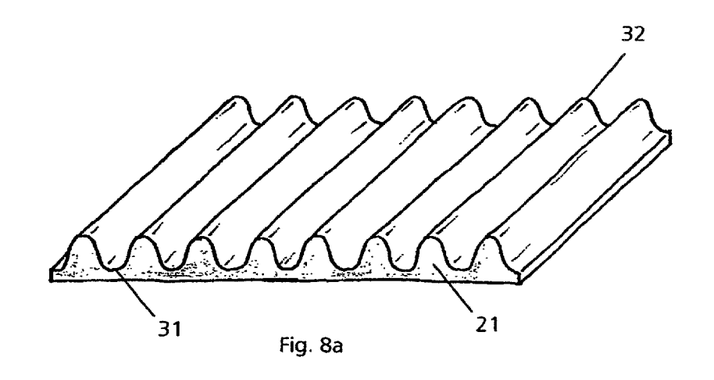
FIGS. 8a, 8b: One or two adsorber elements with a surface structure of groove-shaped depressions engaging in one another.
Figure 8B:
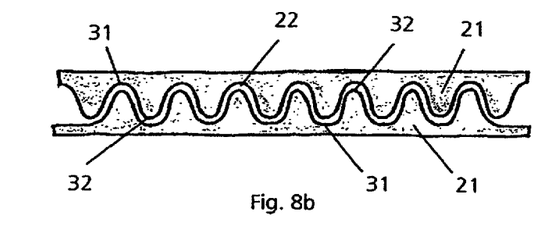

FIG. 8a and FIG. 8b show one or two adsorber elements 21 with which a particularly good utilization of the total volume is achieved with a very short thermal path. Groove-shaped depressions 31 are arranged in the adsorber elements 21 hereby such that the projections 32 lying between two depressions can engage in the depressions 31 of an adjacent adsorber element 21 with the same type of surface structure, so that the two adjacent adsorber elements engage in one another like two combs and a winding. Also, according to a particular embodiment, a narrow channel remains free for the heat transfer fluid 22. If a tube-shaped foil composite is used, the tube must also have between each two adsorber elements, another connection respectively for inflow and outflow of the heat transfer fluid.

The invention claimed is:
1. An adsorption heat pump or adsorption refrigerator, comprising:
 at least one adsorber element having a stable shape;
 an evaporator;
 a condenser; and
 a vacuum-tight adsorbate channel connected to the adsorber element, the evaporator and the condenser through connections;

the at least one adsorber element comprising:
- a heat-conducting solid body and a sorption material for a vaporous adsorbate, said sorption material being arranged on an outer surface of the heat-conducting solid body;
- a fluid-tight composite film being connected flat to the heat-conducting solid body at least in areas of the outer surface of the heat-conducting solid body in contact with a heat transfer fluid;
- said fluid-tight composite film being connected to the heat-conducting solid body positively, non-positively, or by adhesive force;
- said fluid-tight composite film comprising at least one first layer, said first layer being a metal layer and/or a layer of a heat-conducting material oriented perpendicular to the layer; and
- said fluid-tight composite film further comprising at least one second layer, said second layer being a sealing layer or a supporting layer;
- said at least one adsorber element being structured and arranged so that heat exchange, between the heat transfer fluid and at least one of the following two, can take place via the fluid-tight composite film: the heat-conducting solid body and the sorption material arranged thereon.

2. A heat pump or refrigerator according to claim 1, wherein:
- said at least one adsorber element comprises several adsorber elements, including two adjacent adsorber elements connected respectively by means of at least one adsorbate channel;
- said two adjacent adsorber elements are connected respectively through an adsorbate channel extending along an axis;
- additional adsorbate channels of pairs of said several adsorber element extend along said axis.

3. A heat pump or refrigerator according to claim 2, wherein:
- a holding element runs inside said several adsorber elements through the adsorbate channels arranged on an axis or outside the adsorber elements;
- a connection structure is provided at ends of said channels for generating contact pressure to provide a vacuum-tight connection of adsorbate channels and adsorber elements.

4. A heat pump or refrigerator according to claim 1, wherein:
- a sealing element is provided between said at least one adsorber element and said adsorbate channel.

5. A heat pump or refrigerator according to claim 1, wherein:
- said adsorbate channel is structured and arranged to function as a sealing element, and said at least one adsorber element is profiled such that a profiling is embodied at least where said sealing element lies.

6. A heat pump or refrigerator according to claim 1, wherein:
- a surface of the composite film is structured and arranged such that transport of the heat transfer fluid in the fluid phase can take place at least partially by means of a capillary effect;
- the composite film is coated with a wicking material having a capillary structure;
- said at least one adsorber element comprises a plurality of adsorber elements having a rectangular geometric shape, said rectangular geometric shape having a first pair of facing surfaces and a second pair of facing surfaces, said second pair of facing surfaces being spaced apart by a distance greater than a spacing of the first pair of facing surfaces;
- said plurality of adsorber elements being spaced apart less than an average spacing of the first pair of facing surfaces.

7. A heat pump or refrigerator according to claim 1, wherein:
- said at least one adsorber element comprises several adsorber elements, said several adsorber elements being structured and arranged so the heat transfer fluid flows through said several adsorber elements serially and/or parallel.

8. A heat pump or refrigerator according to claim 1, wherein:
- said at least one adsorber element comprises several adsorber elements, said several adsorber elements comprising a group adsorber element arranged to form an adsorber element stack having a comb shape.

9. A heat pump or refrigerator according to claim 1, wherein:
- said at least one adsorber element comprises at least two adjacent adsorber elements having depressions and an identical surface structure;
- projections lying between two depressions of one of said two adjacent adsorber elements can engage in depressions of a second of said two adjacent adsorber elements like two combs.

10. A heat pump or refrigerator according to claim 8, wherein:
- said depressions comprise one or more of the following: dimples, grooves, and slits.

11. A heat pump or refrigerator according to claim 8, wherein:
- said several adsorber elements comprise at least two adsorber element stacks;
- each of the two adsorber element stacks is positioned with respect to one another such that the projections of the comb shapes are positioned relative to each other so the heat transfer fluid can flow along a meandering course.

12. A heat pump or refrigerator according to claim 7, wherein:
- the heat transfer fluid flows through a structure having a tubular shape, said structure being arranged between the comb-shaped adsorber element stacks to have an accordion folding shape.

13. A heat pump or refrigerator according to claim 1, wherein:
- said at least one adsorber element comprises several adsorber elements, said several adsorber elements comprising two groups adsorber element arranged to form two adsorber element stacks, each of said stacks having a comb shape;
- the two adsorber element stacks are positioned with respect to one another such that tips of each of a first of the comb shapes are positioned to touch a rear of a second of the comb shapes.

14. A heat pump or refrigerator according to claim 7, wherein:
- the adsorbate channel extends at a rear of the comb shape that the adsorber element stacks form.

15. A heat pump or refrigerator according to claim 7, wherein:
- the adsorbate channel extends at tips of the comb shape that the adsorber element stacks form.

* * * * *

UNITED STATES PATENT AND TRADEMARK OFFICE
CERTIFICATE OF CORRECTION

PATENT NO. : 8,707,729 B2  Page 1 of 1
APPLICATION NO. : 12/280497
DATED : April 29, 2014
INVENTOR(S) : Schmidt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1495 days.

Signed and Sealed this

Twenty-ninth Day of September, 2015

Michelle K. Lee
*Director of the United States Patent and Trademark Office*